(12) United States Patent
Briffa et al.

(10) Patent No.: US 12,689,992 B1
(45) **Date of Patent: \*Jul. 21, 2026**

(54) REMOTE RADIO HEAD HAVING DYNAMICALLY SCALED OUTPUT POWER LEVELS

(71) Applicant: TalkingHeads Wireless, Inc., Roslindale, MA (US)

(72) Inventors: Mark A. Briffa, Tyreso (SE); Joel L. Dawson, Roslindale, MA (US)

(73) Assignee: TalkingHeads Wireless, Inc., Roslindale, MA (US)

( * ) Notice: Subject to any disclaimer, the term of this patent is extended or adjusted under 35 U.S.C. 154(b) by 1112 days.

This patent is subject to a terminal disclaimer.

(21) Appl. No.: 17/592,482

(22) Filed: Feb. 3, 2022

Related U.S. Application Data

(63) Continuation of application No. 17/525,392, filed on Nov. 12, 2021, now Pat. No. 11,990,926.

(60) Provisional application No. 63/112,534, filed on Nov. 11, 2020, provisional application No. 63/112,515, filed on Nov. 11, 2020, provisional application No.
(Continued)

(51) Int. Cl.
| | |
|---|---|
| *H04B 1/04* | (2006.01) |
| *H03F 3/24* | (2006.01) |
| *H04B 1/12* | (2006.01) |
| *H04W 52/24* | (2009.01) |
| *H04W 52/26* | (2009.01) |
| *H04W 52/36* | (2009.01) |
| *H04W 88/08* | (2009.01) |

(52) U.S. Cl.
CPC ....... *H04W 52/367* (2013.01); *H04W 52/241* (2013.01); *H04W 52/267* (2013.01); *H04W 88/085* (2013.01)

(58) Field of Classification Search
None
See application file for complete search history.

(56) References Cited

U.S. PATENT DOCUMENTS

| | | | |
|---|---|---|---|
| 6,615,052 B1 * | 9/2003 | Parmenter | H04W 52/50 |
| | | | 455/13.4 |
| 2004/0141566 A1 * | 7/2004 | Kim | H04L 1/0656 |
| | | | 375/267 |

(Continued)

OTHER PUBLICATIONS

Non-Final Office Action dated Aug. 18, 2023 for U.S. Appl. No. 17/525,392; 7 Pages.

(Continued)

*Primary Examiner* — Pablo N Tran
(74) *Attorney, Agent, or Firm* — Daly, Crowley, Mofford & Durkee, LLP

(57) ABSTRACT

Described are concepts, systems and techniques for scaling or configuring a cellular network or one or more components thereof to utilize signals having power levels corresponding to power levels which are substantially at or near a minimum amount of power needed at all times to maintain a desired bit rate within a link of a cell in the cellular network. In embodiments, a remote radio head (RRH) may be scaled (e.g. dynamically scaled) so as to provide radio frequency (RF) signals having power levels corresponding to power levels which are substantially at or near a minimum amount of power needed at all times to maintain a desired bit rate within a link of a cell in the cellular network.

4 Claims, 5 Drawing Sheets

Related U.S. Application Data

63/112,526, filed on Nov. 11, 2020, provisional application No. 63/112,542, filed on Nov. 11, 2020.

(56) References Cited

U.S. PATENT DOCUMENTS

| | | | |
|---|---|---|---|
| 2006/0274657 A1* | 12/2006 | Olgaard .................. | H04L 43/00 370/235 |
| 2010/0248660 A1 | 9/2010 | Bavisi et al. | |
| 2011/0021186 A1* | 1/2011 | Fischer ............. | H04W 52/0206 455/574 |
| 2012/0236907 A1* | 9/2012 | Branch ................... | G01S 19/04 375/141 |
| 2012/0328287 A1* | 12/2012 | Grosso ................ | H04J 14/0282 398/79 |
| 2015/0312865 A1* | 10/2015 | Norlund ................ | H04W 52/26 370/329 |
| 2016/0315719 A1 | 10/2016 | Jian et al. | |
| 2018/0062606 A1 | 3/2018 | Lim | |
| 2022/0149874 A1 | 5/2022 | Briffa et al. | |

OTHER PUBLICATIONS

Response to Non-Final Office Action dated Aug. 18, 2023 for U.S. Appl. No. 17/525,392, filed Nov. 15, 2023; 6 Pages.

Restriction Requirement dated Feb. 3, 2023 for U.S. Appl. No. 17/525,392; 6 Pages.

Response to Restriction Requirement dated Feb. 3, 2023 for U.S. Appl. No. 17/525,392, filed May 2, 2023; 1 Page.

Preliminary Amendment dated May 2, 2023 for U.S. Appl. No. 17/525,392; 5 Pages.

Nahas et al.; "Reducing energy consumption in cellular networks by adjusting transmitted power of base stations"; ResearchGate; May 2012; 6 Pages.

Notice of Allowance dated Jan. 12, 2024 for U.S. Appl. No. 17/525,392; 8 Pages.

* cited by examiner

REMOTE RADIO HEAD HAVING DYNAMICALLY SCALED OUTPUT POWER LEVELS

CROSS REFERENCE TO RELATED APPLICATIONS

This application is a continuation of co-pending application Ser. No. 17/525,392 filed Nov. 12, 2021 which claims the benefit the benefit of U.S. provisional application No. 63/112,515 filed on Nov. 11, 2020, and U.S. provisional application No. 63/112,534 filed on Nov. 11, 2020 and U.S. provisional application No. 63/112,526 filed on Nov. 11, 2020 and U.S. provisional application No. 63/112,542 filed on Nov. 11, 2020 the contents of which are all hereby incorporated herein by reference in their entireties.

BACKGROUND

The increase in the number and use of mobile communication networks (e.g. cellular networks) has led to a corresponding increase in the power consumption of mobile communication networks. It would, therefore, be desirable to provide systems and techniques to address power consumption concerns without reducing quality of service in mobile communication networks.

SUMMARY

Based upon a measured signal-to-noise (SNR) on any given link in a cell, the upper limit of channel capacity is known (Shannon limit). Also, based upon a selected coding strategy implemented in a network and the measured SNR, the maximum realizable capacity may be determined. Furthermore, an actual achieved bit rate is known. In accordance with the concepts described herein, it has been recognized the SNR required to achieve a certain bit rate in a network can be determined from known performance metrics for a known coding strategy used in the network. It has also been recognized that if a measured SNR exceeds a "required" SNR, the difference between the two may be considered an "excess" SNR. It has also been recognized that this excess SNR corresponds to an amount of transmitter power which is in excess of that needed to produce an SNR which allows a link to achieve the certain bit rate. That is, it is possible to maintain an actual achieved bit rate while reducing a transmit power level of a base station. In accordance with the concepts described herein, it has been recognized that from measurable performance metrics of a network or portions of a network, one can determine an amount of excess SNR that exists and thus how much excess base station transmit power exists. In accordance with a further aspect of the concepts, systems and techniques described herein, in response to a known actual bit rate achieved in a cellular network, the cellular network may be configured to dynamically scale a power level of a radio frequency (RF) signal transmitted by a base station. In particular, the cellular network may be configured to dynamically scale a power level of an RF signal transmitted by a remote radio head (RRH) to an amount of transmitted output power which is substantially at or near a minimum amount of transmit power needed (and ideally, at all times) to maintain the known, actual achieved bit rate within a link of a cellular network.

With this particular arrangement, the power consumption of a transmit system (e.g. a cellular base station or more particularly of an RRH) may be reduced (or ideally minimized). In embodiments, by transmitting RF signals at an output power level which is substantially at or near a minimum amount of transmit output power level needed to maintain a known actual bit rate, power consumption of a base station or an RRH can be reduced below the power consumption used in a conventional base station system or RRH. Furthermore, by transmitting signals at an output power level which is at or near a minimum amount of transmit power needed to maintain the known actual bit rate, the power consumption of an RRH or base station may be reduced (and ideally, minimized) compared with power consumption of a conventional RRH or base station.

In embodiments, an RF transmit signal path in a remote radio head (RRH) of a distributed base station (and in particular, an RF power amplifier (PA) in a transmit signal path) can be scaled (e.g. dynamically scaled) or designed to maintain an efficiency (i.e. the amount of RF output power produced by a PA from a given amount of de input power) which is high compared with the efficiency of conventional RRHs.

In embodiments, by observing long-term statistics, it is possible to design an RRH and/or active antennas to have a form factor which is smaller than a form factor of a conventional RRH. This is possible since, in accordance with the concepts described herein, the RRH may be designed to satisfy system requirements derived from observing long-term statistics of a network and/or of links in a network. This is in contrast to conventional approaches of designing an RRH to satisfy worst case scenarios. This allows an RRH to use power amplifiers (PAs) having maximum output power ratings which are less than the maximum output powers of PAs used in conventional RRHs without any substantial decrease in RRH and/or cell network performance. Since lower power PA's are used, there can be a concomitant decrease in the size and/or weight of heat sinks in the RRH compared with heat sinks used in conventional RRHs. This, in part, may result in RRHs which are physically smaller (in area and/or volume) and lighter than conventional RRHs.

In embodiments, one feedback mechanism utilizes real-time measurements of SNR, bit rate, and/or achieved capacity. Designing networks, systems and components in accordance with the concepts described herein leads to an adaptable cellular network and ideally leads to a maximally adaptable cellular network.

In embodiments, one feedback mechanism is feedback based upon long-term network statistics.

In embodiments, multiple feedback mechanisms can be used. For example, in embodiments, real-time measurements of SNR and/or bit rate and/or achieved capacity and/or long-term network statistics can be used. In embodiments, the some or all of the above feedback mechanisms can be used alone or can be used in combination.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like names designate corresponding parts throughout the different views. Furthermore, embodiments are illustrated by way of example and not limitation in the figures, in which.

DETAILED DESCRIPTION

Figure 1:
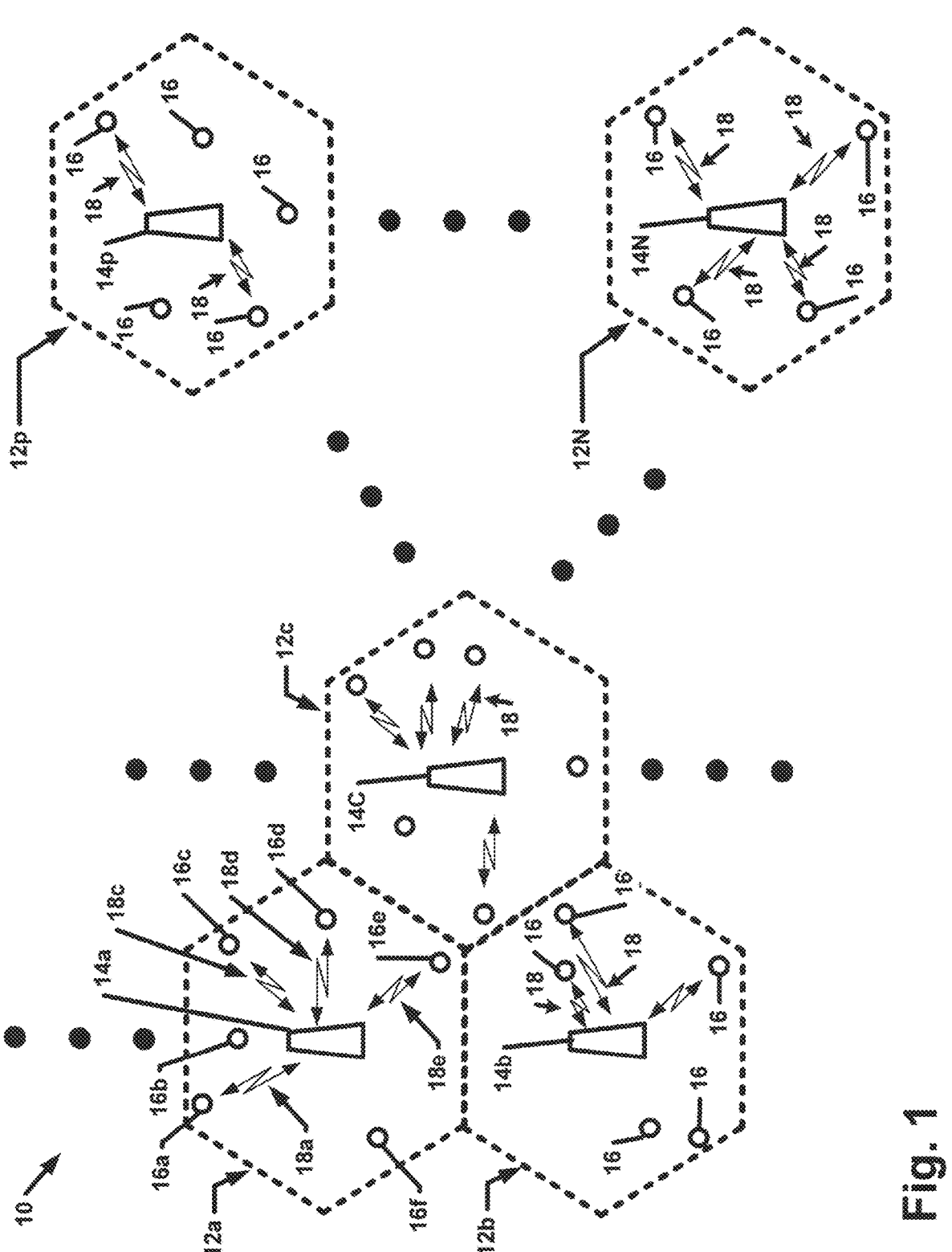
FIG. 1 is a block diagram of a cellular network having multiple cells.

Referring now to FIG. 1, a cellular network 10 comprises a plurality of cells 12a-12N. In this illustrative embodiment, cellular network 10 is illustrated as a Global System for Mobile (GSM) cellular network in which base stations are deployed to establish cells having substantially uniform hexagonal shapes. In this illustrative embodiment, cells 12a-12N comprise at least one distributed base station 14a-14N As used herein, the phrase "distributed base station" comprises a baseband unit and one or more remote radio heads (RRHs). The RRH's are typically coupled to a cell tower as is generally known. Such RRHs may be located substantially at or near the center of each cell and be coupled to one or more antennas. In embodiments, the one or more antennas may be integrated with RRH circuitry to provide an integrated antenna/RRH. Thus, a so-called integrated RRH may comprise RRH circuitry and one or more antennas. The one or more distributed base stations may be the same as or similar to the distributed base stations to be described below in conjunction with FIGS. 2A-3.

Taking cell 12a as representative of cells 12b-12N, cell 12a comprises distributed base station 14a. Distributed base station 14a comprises a baseband unit coupled to one or more RRHs (which maybe integrated RRHs).

At certain points in time, one or more mobile units generally denoted 16 are positioned in various ones of cells 12a-12N. In the example of FIG. 1, mobile units 16a-16f may be positioned within cell 14a at certain points in time or for periods of time. While within cell 14a, one, some or all of the mobile units 16a-16f may establish a wireless communication link (or more simply, a link generally denoted 18) with distributed base station 14a. In the example of FIG. 1, mobile units 16a and 16c-165e establish corresponding links 18a and 18c-185e with distributed base station 34a (e.g., unit via an RRH) while mobile units 16b, 16f do not establish links with distributed base station 14a Each link 18a and 18c-18 e has an associated signal to noise ratio (SNR), Based upon a measured signal-to-noise ratio (SNR) on any given link in a cell, the upper limit of channel capacity is known (Shannon limit). Also, based upon a selected coding strategy implemented within a network (e.g. convolution coding) and the measured SNR, the maximum realizable capacity for a channel may be determined. Furthermore, an actual achieved bit rate in a link may be measured and thus known.

The SNR required to achieve a certain bit rate in a link of network 10 can be determined from known performance metrics of a coding strategy used in the network. If a measured SNR exceeds this "required" SNR, the difference between the two may be considered an "excess" SNR. It has also been recognized that such excess SNR corresponds to an amount of base station transmitter power which is in excess of that base station transmitter power needed to produce an SNR which allows a link to achieve the certain bit rate. That is, it has been recognized that under certain conditions, it is possible to reduce an amount of base station transmit power while maintaining a same actual achieved bit rate of a link. In accordance with the concepts described herein, it has been recognized that from data collected in a network (e.g. including but not limited to SNR. data), one can determine how much excess SNR exists and thus how much excess transmit power exists.

Such information may be used to dynamically adjust transmit power of a base station or an RRH or design a base station or RRH which transmits signals at a power level which is below power levels transmitted by conventional RRHs and which ideally which is at or near a minimum amount of transmit power required to establish a desired bit rate (e.g. a bit rate which is substantially the same as an actual achieved bit rate of a link operating with a conventional RRH).

Thus, in response to a known actual bit rate achieved in the cellular network, the cellular network may be configured to dynamically scale a base station transmitted output power (e.g. as transmitted via an RRH) to an amount of transmitted output power which is substantially at or near a minimum amount of transmit power needed (ideally, at all times) to maintain an achieved bit rate. With this approach, the power consumption of a transmit system in an RRH may be reduced (or ideally minimized). In embodiments, by transmitting an output power which is substantially at or near a minimum amount of transmit power needed to maintain a known actual bit rate, power consumption of a transmit system can be reduced below the power consumption used in a conventional RRH/base station system. Furthermore, by transmitting signals at an output power level which is consistently (and ideally always or substantially always) at or near a minimum amount of transmit power levels needed to maintain the known actual bit rate (and ideally always maintain the known actual bit rate), the power consumption of an RRH transmit system may be reduced below that of a conventionally operating RRH (and ideally may be minimized).

In embodiments, the RF transmit signal path (and in particular the RF PA in an RRH transmit signal path), can be scaled (e.g. dynamically scaled) to maintain an efficiency which is higher than an efficiency achievable with existing conventional systems. In embodiments, a transmit signal path (of an RRH, for example) may comprise a transmit-receive (T/R) circuit.

Furthermore, in embodiments, by observing long-term statistics, it is possible to design a remote radio head (RRH) and/or active antennas to have a form factor (e.g., one or more of a size, shape, area and/or volume) which is smaller than a form factor of a conventional RRH. This is possible since, in accordance with the concepts described herein, it has been recognized that an RRH may be designed to satisfy/meet link or network characteristics (or needs) derived or otherwise measured or determined from observing long-term statistics of a link and/or network.

Figure 2A:
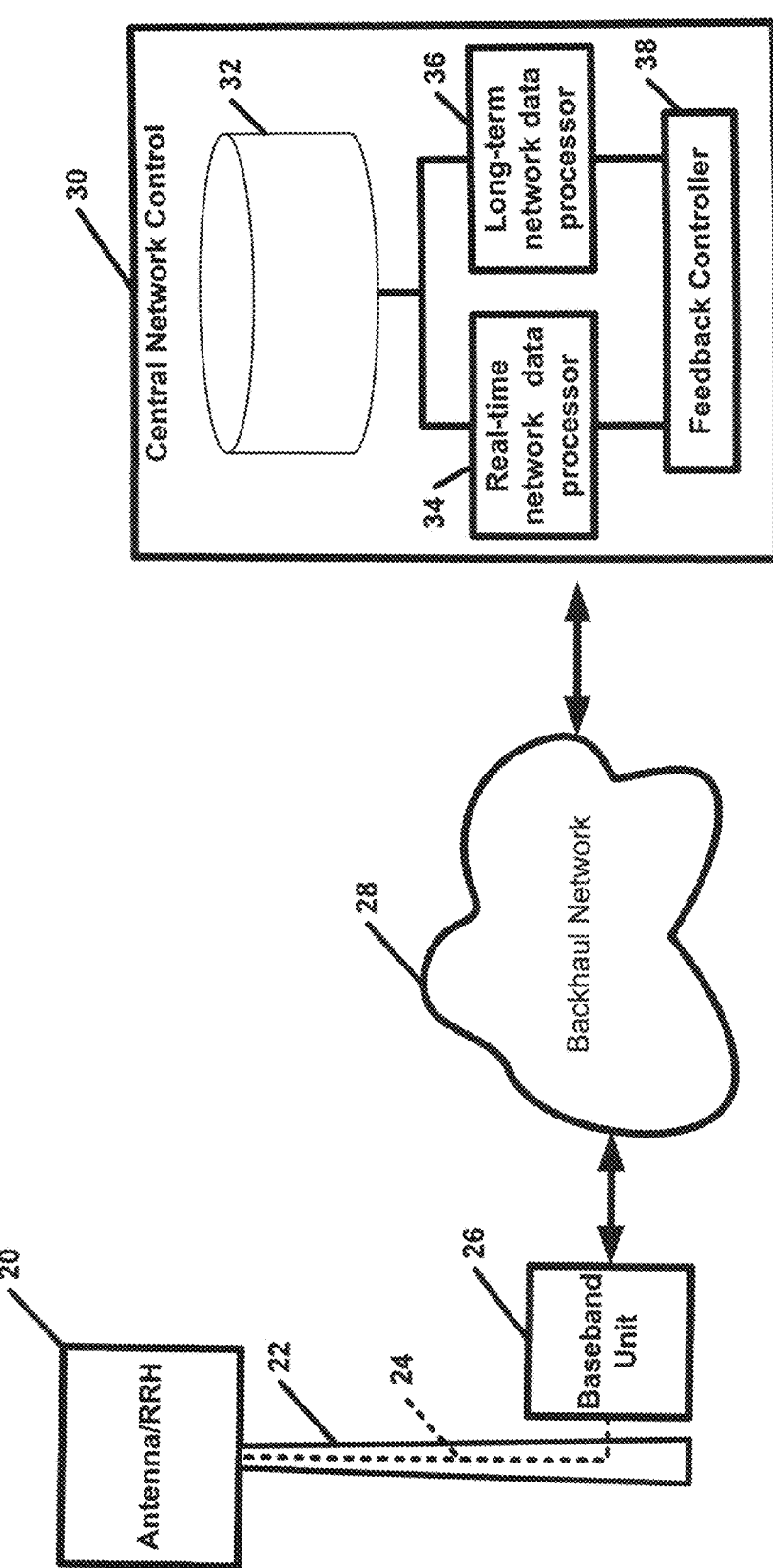
FIG. 2A is a block diagram of a single cell of a cellular network having a remote radio head (RRH) and baseband unit coupled to a central network control through a backhaul network.

Such measured, derived, or otherwise determined characteristics/needs may be determined from network-related information collected and stored in a database (e.g. such as database 32 in FIG. 2A) and computed or otherwise determined by one or both of processors 34, 36 in FIG. 2A). This design approach leads to smaller (i.e. physically smaller in area and/or volume), physically lighter RRHs. Designing networks, systems and components in accordance with the concepts described herein leads to an adaptable cellular network and ideally leads to a maximally adaptable cellular network comprising RRH's which are both smaller and highly efficient relative to conventional RRHs.

This design approach is in contrast to conventional approaches to RRH design in which an RRH is designed to always (or substantially always) satisfy/meet worst case link or network characteristics or scenarios.

In embodiments, a feedback mechanism may be used to measure or otherwise capture real-time measurements of SNR, bit rate, and/or achieved capacity. In embodiments, one feedback mechanism is feedback based upon long-term network statistics. In embodiments, multiple feedback mechanisms can be used. For example, in embodiments, real-time measurements of SNR and/or bit rate and/or achieved capacity and/or long-term network statistics can be used. In embodiments, the some or all of the above feedback mechanisms can be used alone or can be used in combination.

Referring now to FIG. 2A, an antenna and RRH 20 deployed or otherwise disposed on a cell tower are coupled to a baseband unit 26. RRH 20 may be coupled to baseband unit 26 using wireless techniques (e.g. microwave, millimeter wave (MMW), free space optics (FSO) links or using hard wire techniques (e.g., fiber optic cable).

In some embodiments, the antenna and RRH may be provided as separate components which are coupled together via a mechanical connection such as via a coaxial cable with a first end having an RF connector coupled to an antenna port and a second end having an RF connector coupled to an output port of an RRH transmit signal path comprising a PA to thus provide an RF signal path between an output of the PA and an input of the antenna. In other embodiments, the antenna and the RRH may be provided as an integrated unit (i.e. an integrated RRH/antenna unit) in which case a coaxial cable connection between the antenna and the RRH circuitry may not be required.

The baseband unit 26 is coupled through a network 28 (a so-called backhaul network) to a central network control 30 (e.g. a so-called central office). Network characteristics (including link and/or channel characteristics) which may be measured, collected or otherwise determined as well as information related or derived from network characteristics may be provided to one or more databases 32 (with a single database being illustrated in FIG. 2A) and/or one or more processors 34, 36 from the baseband unit 26. Such information may, for example, include but is not limited to measured SNR, the maximum realizable capacity for a channel. an actual achieved bit rate. Such information may be collected on individual links, on individual cells, or on the network as a whole.

Such information may be used dynamically scale a transmit signal path in an RRH such that the RRH operates at and maintains an efficiency which is higher than an efficiency achievable with prior art RRHs. In embodiments, a transmit signal path includes at least a PA (e.g. a PA provided as part of a transmit-receive (T/R) circuit).

Furthermore, in embodiments, by observing long-term statistics, it is possible to design an RRH and components of an RRH to have a form factor (e.g., one or more of a size, shape, area and/or volume) which is smaller than a form factor of a conventional RRH and/or components which make up a conventional RRH. In the case of an integrated RRH, the re-designed components may include one or more re-designed antennas (e.g. an active antennas). This is possible since, in accordance with the concepts described herein, the RRH may be designed to satisfy/meet characteristics (or needs) by taking into account long-term statistics of a network, rather than always preparing for the absolute worst case. Such derived characteristics/needs may be derived or determined from network-related information collected and stored in database 32 and computed or otherwise determined by one or both of a real-time data processors 34 and/or a long-term data processor 36. This design approach leads to RRHs which are smaller (i.e. physically smaller in area and/or volume), and physically lighter than conventional RRHs. It should appreciated that while processors 34, 36 are illustrated as separate processors in the example of FIG. 3, in embodiments a single processor may implement all functions performed by the two processors 34, 36. Similarly, although database 32 is illustrated as a single database, in embodiments, multiple separate databases may be used.

Figure 2B:
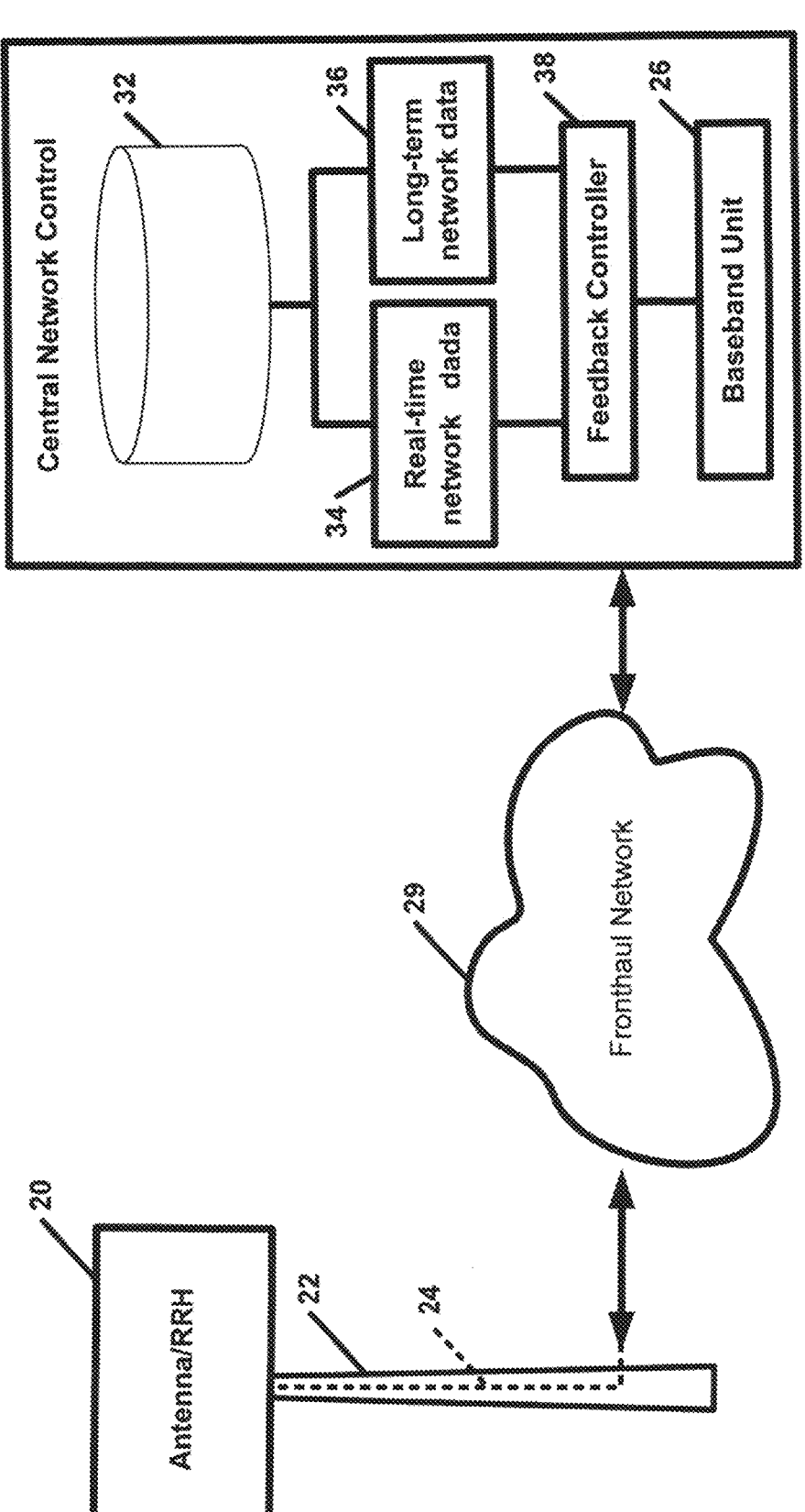
FIG. 2B is a block diagram of a single cell of a cellular network having an RRH coupled through a fronthaul network to a baseband unit located in a central network control.

Referring now to FIG. 2B in which like elements of FIG. 2A are provided having like reference designations, in this embodiment a distributed base station comprises RRH 20 and base station 26 with base station 26 being located in the central network control 30 (e.g. a central office). Thus, in this embodiment, RRH 20 is coupled to baseband unit 26 through a network 29 (a so-called fronthaul network).

Figure 3:
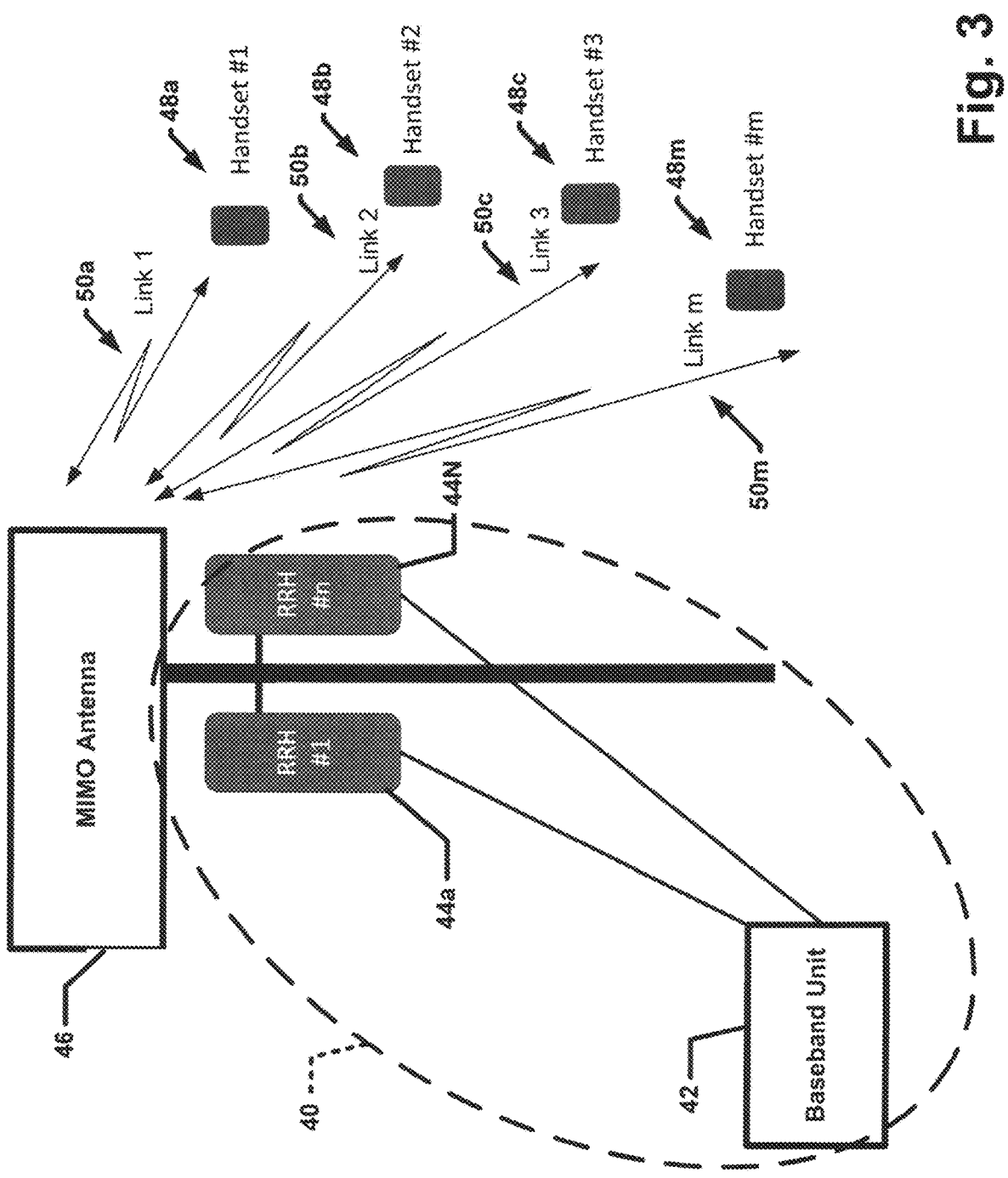
FIG. 3 is a block diagram of an example architecture of a single cell of a cellular network which may be the same as or similar to one of the cells in the example network of FIG. 1.

Referring now to FIG. 3, a portion of a cellular network comprises a distributed base station 40 have a baseband unit 42 communicatively coupled to one or more remote radio heads (RRHs) 44 (with two RRHs 14a, 14N being illustrated in FIG. 3).

As noted above, baseband unit 42 may be coupled to the RRHs 44a, 44N using wireless techniques (e.g. microwave, millimeter wave (MMW), free space optics (FSO) links or using hard wire techniques (e.g., fiber optic cable). RRHs may contain radio frequency (RF) circuitry in addition to analog-to-digital converters (ADCs) or digital-to-analog converters (DACs) and frequency translation circuits (e.g., up/down converters such as RF mixers). In particular RRHs 44 include a transmit signal path (sometimes referred to as an "RF line-up") which comprises one or more PAs which amplify RF signals provided thereto which are then emitted through the antenna.

RRH units 44 are coupled to one or more antennas 46. One or more mobile communication devices (with m such devices 48a-48m being shown in FIG. 1) coupled to the RRHs 44 through corresponding communications links 50a-50m. The mobile communication devices 48a-48m may correspond to handsets (e.g. smart phones, (including but not limited to iPhones, Android mobiles), tablet computers or any other type of mobile communication device.

RF signals (e.g. transmit signals) generated via the RRHs are emitted though antenna 46 and an RF signals provided by handsets 48 are received through antenna 46 and coupled or otherwise provided to one or more RRHs 44. In embodiments, antenna 46 may be provided having a substantially omnidirectional antenna pattern or a directional antenna pattern. Those of ordinary skill in the art will appreciate how to select appropriate antenna characteristics (including antenna pattern) to suit the needs of a particular application. In embodiments, antenna 46 may be provided as a multiple-input, multiple-output (MIMO) antenna. In embodiments, antenna 46 may be provided as a MIMO antenna having a substantially omnidirectional antennas pattern. In embodiments, antenna 46 may be provided as a MIMO antenna having a substantially directional antenna pattern. In embodiments, antenna 46 may be integrated with RRH 14. The baseband unit and RRHs are operable with GSM, CDMA, UMTS, LTE, 4G, 5G, 6G technologies.

As noted above, based upon a measured signal-to-noise (SNR) on any given link in a cell (e.g. one of links 50a-50m in the cell of FIG. 3), the upper limit of channel capacity is known and based upon a selected coding strategy implemented in the link and the measured SNR, the maximum realizable channel capacity may be determined. Furthermore, an actual achieved bit rate in each link is known.

From these data, it can be determined how much "excess" SNR exists (with "excess" SNR being that amount of SNR which is above the amount to needed to continue communication at the actual achieved bit rate in a link). In response to the known actual bit rate achieved in a cellular network (e.g. in links of a cellular network), the cellular network may be configured (or scaled) such that a transmitted output power of the RRHs are set to amounts of transmitted output power which are substantially at or near a minimum amount of transmit power needed to maintain an achieved (or desired) bit rate.

In this way, the power consumption of an RRH may be reduced (or ideally minimized). Thus, the base station (e.g. baseband unit or RRH) may comprise or be coupled to a controller (e.g. such as one or both of processors 34, 36) capable of receiving data provided thereto and in response thereto determining a transmitted output power required of an RRH within a cellular network such that the RRH provides an amount of transmitted output power which is substantially at or near a minimum amount of transmit power needed at all times to maintain an achieved (or desired) bit rate.

In embodiments, an RRH which transmits signals at an output power which is substantially at or near a minimum amount of power needed to maintain a known or desired bit rate, power consumption of an RRH can be reduced below the power consumption used in a conventional RRH. Furthermore, by transmitting an output power which is at or near a minimum amount of transmit power needed to always maintain the known actual bit rate (and ideally which is always or nearly always at or near a minimum amount of transmit power needed to always maintain the known actual bit rate), the power consumption of an RRH may be minimized.

In embodiments, the RF lineup (and in particular RF PAs in a transmit signal path of an RRH), can be dynamically scaled to keep the efficiency high.

It has been recognized herein that by observing long-term statistics (e.g. SNR, bit rate, and/or achieved capacity), it is possible to design a remote radio head (RRH) and/or active antennas having a form factor which is smaller than the form factor of a conventional RRH and/or active antennas. This is possible since, in accordance with the concepts described herein, the RRH may be designed to satisfy needs derived from observing long-term statistics, rather than designed according to worst case scenarios. Such a design approach leads to smaller (in area and/or volume), lighter and/or more reliable RRHs.

In embodiments, one feedback mechanism utilizes real-time measurements of SNR, bit rate, and/or achieved capacity. Designing networks, systems and components (e.g., RRHs, power amplifiers, baseband units and other components) in accordance with the concepts described herein leads to an adaptable cellular network and ideally leads to a maximally adaptable cellular network which is highly efficient compared with existing conventional networks, systems and components. In embodiments, one feedback mechanism is feedback based upon long-term network statistics. In embodiments, multiple feedback mechanisms can be used. For example, in embodiments, real-time measurements of SNR and/or bit rate and/or achieved capacity and/or long-term network statistics can be used. In embodiments, the some or all of the above feedback mechanisms can be used alone or can be used in combination.

Figure 4:
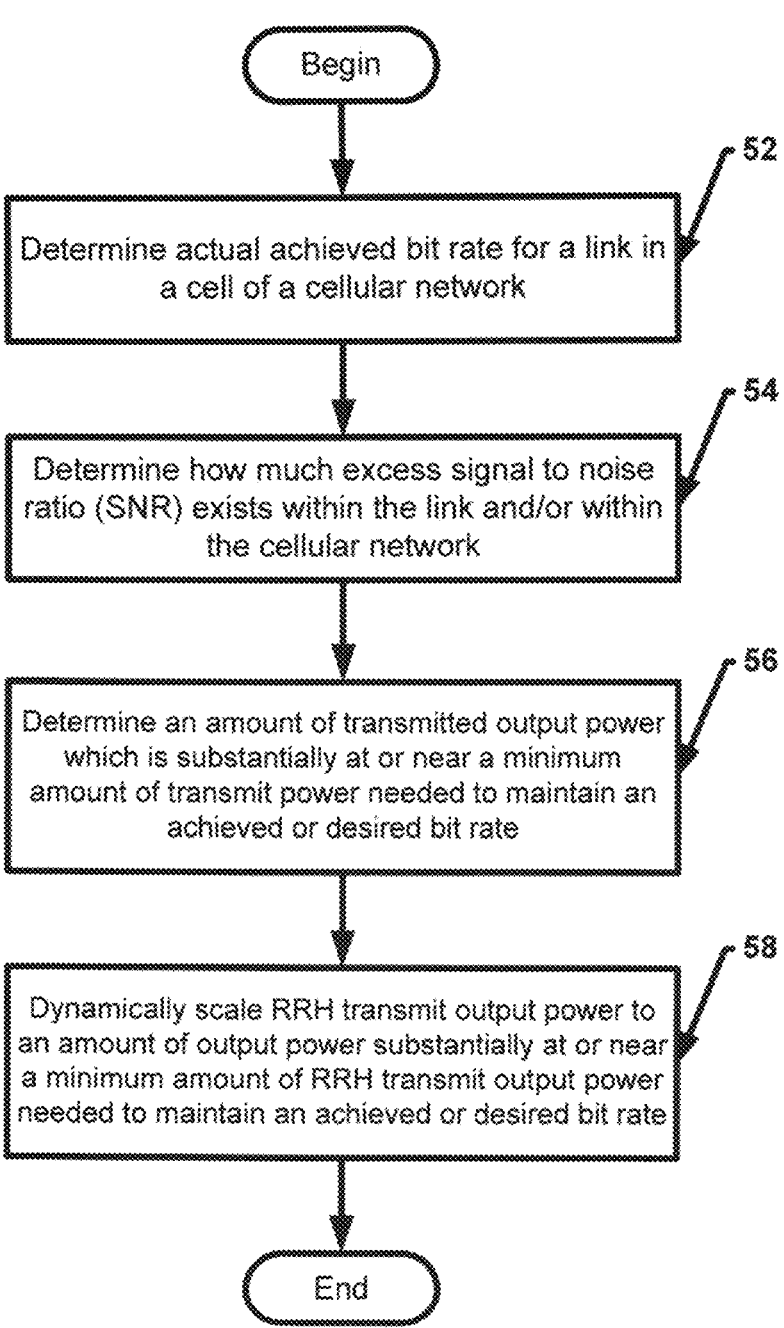
FIG. 4 is a flow diagram of a process for dynamically scaling a transmitted output power provided at an RRH to an amount of transmitted output power which is substantially at or near a minimum amount of transmit power needed to maintain a desired bit rate.

FIG. 4 is a flow diagram showing illustrative processing that can be implemented within the system of FIGS. 1-3. Rectangular elements (typified by element 52 in FIG. 4, denoted as "processing blocks," represent computer software instructions or groups of instructions. Alternatively, the processing blocks may represent functions performed by functionally equivalent circuits such as a digital signal processor circuit or an application specific integrated circuit (ASIC). The flow diagram does not depict the syntax of any particular programming language. Rather, the flow diagram illustrates the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated, the particular sequence of blocks described is illustrative only and can be varied without departing from the spirit of the concepts, structures, and techniques described. Thus, unless otherwise stated the blocks described below are unordered meaning that, when possible, the functions represented by the blocks can be performed in any convenient or desirable order.

Turning now to FIG. 4, a flow diagram of a process for dynamically scaling a transmitted output power to an amount of transmitted output power which is substantially at or near a minimum amount of transmit power needed at all times to maintain a desired bit rate includes determining an actual achieved bit rate for a link in a cell of a cellular network (52), determining the amount of excess signal to noise ratio (SNR) which exists within the link and/or within the cellular network (54), determining an amount of transmitted output power which is substantially at or near a minimum amount of transmit power needed at all times (and ideally, needed at all times) to maintain an achieved or desired bit rate (56) and dynamically scaling RRH RF signal output power levels to levels corresponding to determined amount of transmitted output power levels which are substantially at or near a minimum amount of transmit power needed (and ideally need at all times) to maintain an achieved or desired bit rate.

As used herein, a desired bit rate may be understood as follows. A central network control (e.g. a carrier) decides, based on extensive link budget analysis and processing performed at or through a central network control, for example, what bit rate to support at a given time and in a given location (e.g. in a given cell or in a link within a cell). Margin is built into this, so that if, for example, the SNR in the channel suddenly improves, the system may not automatically alter its transmission strategy to increase the bit rate. In this case there exists "excess" SNR, which is another way of saying that in this circumstance, the system is transmitting more power than needed for the given bit rate.

With respect to the difference between determining excess SNR within the link vs. determining excess SNR within the cell, this concept may be understood as follows. If the discussion is limited to excess SNR within each link, the SNR on a link is measured or otherwise determined with an associated bit rate and a minimum SNR required on the same link to maintain the same associated bit rate is determined. If the measured (actual) SNR is greater than the minimum required SNR, the difference between the two SNRs is the excess SNR. For managing an entire network (e.g. network 10 in FIG. 1) or one or more cells within a network (e.g., one or more of cells 12*a*-12N in FIG. 1) it is helpful if the central network control knows the excess SNR of all of the links, meaning every connection between a base station and a user, so that it can make global power allocation decisions.

With respect to how one would configure the cellular network to dynamically scale the transmitted output power, if it is determined that a given base station transmitter or an RRH is operating with "excess SNR" of 1 dB (for example), then the output power is scaled down in response by 1 dB (and ideally, by exactly 1 dB). Configuring the network means making such adjustments for all of the base station transmitters (e.g. all RRH units) in the network.

Although reference is made herein to particular systems or configurations, it is appreciated that other systems or configurations having similar functional and/or structural properties may be substituted where appropriate, and that a person having ordinary skill in the art would understand how to select such systems or configurations and incorporate them into embodiments which incorporate the concepts, techniques, and structures set forth herein without deviating from the scope of those teachings.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal, "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within +5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A remote radio head (RRH) configured to communicate with a mobile unit over a wireless communication link, the RRH comprising:

at least one power amplifier (PA) configured to provide an amount of output power which is substantially at or near a minimum amount of output power required to maintain a selected bit rate between the RRH and the mobile unit via the wireless communication link, wherein the output power level of the PA is dynamically scaled to the determined amount of transmitted output power which is substantially at or near a minimum amount of transmit power needed at all times to maintain the selected bit rate.

2. The RRH of claim 1 further comprising means for receiving one or more control signals to dynamically scale an output power of the PA such that the PA is operated to provide an amount of transmitted output power substantially corresponding to an amount of transmit power needed to maintain the selected bit rate.

3. The RRH of claim 1 further comprising means for receiving one or more control signals to dynamically scale an output power of the PA such that the PA is operated to provide an amount of transmitted output power substantially corresponding to an amount of transmit power needed to maintain the selected bit rate at all times.

4. The system of claim 3 wherein the selected bit rate corresponds to an achieved bit rate.

* * * * *